Sept. 28, 1965   W. D. CHAMBERS ETAL   3,208,559
BRAKE MECHANISM AND MEANS TO COOL SAME
Filed March 13, 1963
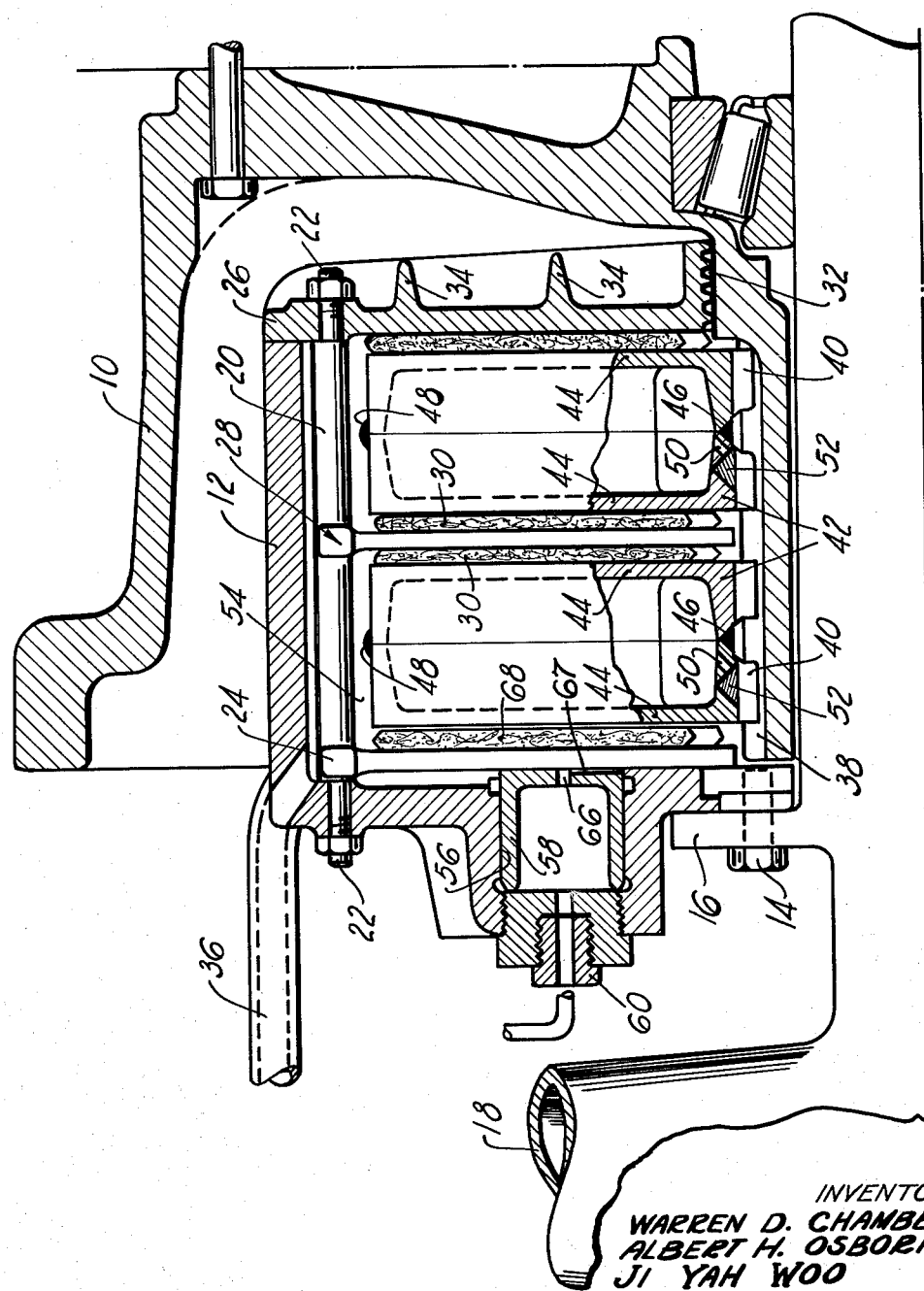
INVENTORS
WARREN D. CHAMBERS
ALBERT H. OSBORNE
JI YAH WOO
BY
Richard D. Geib
ATTORNEY United States Patent Office 3,208,559
Patented Sept. 28, 1965

3,208,559
BRAKE MECHANISM AND MEANS TO
COOL SAME
Warren D. Chambers, Albert H. Osborne, and Ji Yah
Woo, South Bend, Ind., assignors to The Bendix Corporation, South Bend, Ind., a corporation of Delaware
Filed Mar. 13, 1963, Ser. No. 264,934
2 Claims. (Cl. 188—264)

This invention relates to brake mechanism and more particularly to the cooling of brake mechanism by a progressive change of state of solid to a vapor, which vapor is exhausted to increase the cooling capacity of the brake mechanism.

Various expedients have been suggested to reduce brake temperature. Forced air circulation has been tried, as has also cooling by water spray. Other methods have been the creation of "heat sinks" in the brake drums utilizing liquids and solids, and it has also been suggested that pressure relief systems be incorporated in liquid "heat sinks" to carry away the heat of the liquid and the latent heat of vaporization.

For one reason or another the above systems have proven impractical for ultra-high temperature applications. For example, at temperatures above 1000° F. the liquid cooling and pressure relief system are rendered inoperative and the change of state process of a solid material is limited to the temperatures wherein said liquid does not vaporize. It may be urged that it would be a likely expedient to produce a pressure sensitive valve for the chambers containing the solid material to allow venting of the vapors created by ultra-high temperatures acting thereon to thereby take advantage of the latent heat of vaporization removal. However, such pressure responsive systems have proven to be too fragile for ultra-high temperature applications which could lead to erratic cooling.

The present invention has for its principal purpose the elimination of such problems by insuring positive reaction to vaporization of a coolant. In more detail, it is an object of this invention to cool a brake mechanism by removal of the heat of liquefaction and heat of vaporization.

It is also an object of this invention to provide a cooling system for a brake mechanism normally maintained at a high temperature; i.e., a temperature above the liquid state of today's known liquid coolants.

It is a further object of this invention to maintain a brake mechanism at or about 1000° F.

Other and further objects can be realized from the following description and drawing in which we have shown an enlarged view of a brake assembly detail employing the present invention.

With the ever increasing cruise and landing speeds the problem of absorbing landing energies has become a major consideration. As above mentioned, various methods have been studied. However, none have been shown to be adequate to date for a brake system that may be soaking at a temperature of 1000° F. Basically, most systems to date start functioning at room temperatures and are inadequate at such extreme temperatures, and if one were to adapt present day systems to such a problem, he would find that he would encounter structural problems of almost an insurmountable nature; i.e., the pressures generated with a liquid coolant and the inadequate "heat sink" capacity of a non-vented solid coolant.

We have, however, determined that a light weight landing gear is an achievable product with the utilization of a solid material which in changing from a solid to a liquid and thence to a vapor absorbs the high temperature and by venting the vapor we can maintain a desirable brake temperature. We have also found that several materials are presently available which afford the desired heat absorbing characteristics and low pressure qualities. For example, the sodium salts such as sodium potassium and sodium chloride and the metal lithium have proven to exhibit the desired qualities which may be related to the amount of B.t.u.'s removed per pound of coolant.

As compared with water, which has a specific heat of 1, one B.t.u. is required to raise the temperature of one pound of water one degree Fahrenheit, water would remove 18 calories versus the removal of 5 and 9 calories approximately by lithium and sodium potassium, respectively, per degree of gram molecular weight (mole) at normal temperatures.

With reference to the drawing a segment of a wheel 10 is shown having an annular brake carrier 12 mounted about the wheel center line such that said carrier does not rotate with said wheel. More particularly, the carrier is mounted, as by bolt 14 to the axle flange 16 of the strut 18. Along the outer periphery of the carrier 12 a stator key 20 is mounted as by a through bolt 22, and a pressure plate 24 is slidably mounted on said key, as is a backing plate 26 and a stator assembly 28. The stator assembly is provided with linings 30, which linings may consist of an iron or similar high temperature metal ceramic composition having a near constant coefficient of friction. The carrier is also provided with an annular seal 32 and fins 34 which fins aid in dissipating heat, as will be hereinafter further detailed. In addition, a vent 36 is provided to allow vapor within carrier housing 12 to escape to the surrounding atmosphere.

The wheel 10 is provided with a drive key 38 which cooperates with teeth 40 of rotor assemblies 42, consisting of two annular members 44 welded together along an inner diameter and an outer diameter as at 46 and 48, respectively. Thus, the wheel and rotor assemblies rotate together.

After the two members 44 are welded together they are filled with a liqueous material, such as the sodium potassium mentioned, through the opening 50. The liquid material is allowed to solidify after which a vacuum is drawn and the inlet sealed, as by a fuse plug 52 brazed in opening 50. The brazing alloy is of a high silver composition capable of bonding at or above 1734° F., which means fuse plug 52 is free to fall from opening 50 at about 1734° F. vapor temperature.

As may be seen the carrier 12 is large enough to provide a cavity 54 about the rotor and stator mechanism, and a chamber 56 is formed on the strut side of the carrier, which chamber receives a piston 58. The piston 58 reciprocates within chamber 56 under the control of a fluid supplied to the chamber by a fitting 60. The piston is provided with a vent 66 and radial passage 67 to port excessive pressures and afford protection to the pressure plate as well as to purge the cavity 54. Movement of the piston forces the pressure plate 24 with its lining 68 to press against the rotor while similarly engaging linings 30 to retard the wheel.

Brake operation is conventional, as for any hydraulic brake, except we recommend that the actuating medium be a moisture free inert gas. As the piston 58 is advanced a small amount of gas is metered through the vent 66 and radial passage 67 to purge the cavity 54. Simultaneously the heat being generated by the lining is transferred through the rotor walls and stored in the liquid sodium, or, if the sodium material has not been subjected to a 1000° F. soaking temperature, as would be experienced by ultra-high speed flight, to the solid sodium material or its equivalent. In any event, after the heat of braking has reached 1000° F. the material within the rotors is in a liqueous state and it will act as a heat sink until the temperature rises to approximately 1634° F. where the material is now in a vapor state or in the process of changing thereto. Thus, temperatures on the order of 1600° F. are absorbed by changing from a solid to a liquid and thence to a vapor, and in the vapor state the pressure within the rotor has been found to be on the order of 1.0 millimeter of mercury which presents no pressure problem to the brake rotor structure. If the temperature continues to rise the brazing alloy for the fuse plug 52 will melt allowing the vapor within the rotor to escape to the cavity 54 to flow about the linings and pick up heat from the linings directly. In flowing through the cavity the vapor is in contact with the carrier walls, which walls act to dissipate heat due to the large surface area provided by the fins 34. When the cavity is completely filled the vapor therein is vented overboard as by vent 36, which exhausted vapor not only carries away the heat of vaporization, but also the heat of the liquid.

In addition, by placing the fuse plug at the inside diameter of the rotor we allow vapor from within the rotor assembly 42 to escape; whereas, the liquid sodium is held by centrifugal force against the outer wall of the rotor and thus does not escape through the bore 50.

As other structure may be readily designed by those skilled in the art without departing from the intent of our invention, we do not intend to be limited by the above description, but rather by the appended claims.

We claim:

1. In combination with a vehicle wheel and a braking element thereon, a means for cooling said braking element comprising:
   a brake rotor drivingly mounted to said wheel, said rotor being formed with a cavity therewithin and an opening in the walls thereof leading to said cavity;
   a brake carrier housing surrounding said brake rotor and operatively associating a brake stator assembly with said rotor, said carrier housing having external fins and providing a space about said rotor and stator assembly;
   a normally solid material in said brake rotor cavity having a greater specific heat than the substance from which the rotor is made;
   a fuse plug sealing said brake rotor cavity which is adapted to dissolve at a predetermined temperature to allow the removal of a latent heat of vaporization from within said rotor;
   a vent means to port any vapor within said carrier housing to allow for the purging of atmosphere from within said carrier housing and thereafter the removal of said latent heat of vaporization after said fuse plug has dissolved to permit vapor from within the brake rotor cavity to flow into the carrier housing; and
   a pressure responsive means operatively connected in said brake carrier housing for actuating the braking element by means of a pressurized gas, said pressure responsive means having an orifice therethrough leading from one side of said pressure responsive means to the other side of said pressure responsive means with a radial passage communicated to the orifice on the other side of said pressure responsive means to allow a limited flow of pressurized gas acting upon said pressure responsive means to be exhausted from said pressure responsive means into said carrier housing through said orifice and radial passage in said pressure responsive member to provide a continuous purging medium for said carrier housing so long as said pressure responsive means is being actuated by the pressurized gas to preclude any harmful interaction between incompatibile fluids within said carrier housing.

2. Brake mechanism comprising:
   a wheel;
   a brake carrier housing operatively mounted to said wheel, said brake carrier housing slidably mounting a brake pressure plate, a stator and a back-up plate, and at least one friction surface, said brake carrier housing being mounted interiorly of said wheel;
   a rotor assembly mounted for rotation with said wheel within said brake carrier housing, said rotor being operatively related to said pressure plate, back-up plate, stator and friction surface;
   a means within said rotor assembly having a greater calorie removal rate per gram molecular weight than the surrounding structure of said brake mechanism to absorb heat from the brake mechanism;
   a heat-sensitive valve allowing passage of the means within said rotor assembly to the interior of said brake carrier housing upon the reaching of a preselected temperature by said means within said rotor;
   a brake actuating mechanism including a cylinder, a means for supplying an inert gas to said cylinder and a pressure responsive means within said cylinder, which pressure responsive means has a restricted flow passage therethrough that is communicated with a radial passage that is open before, during and after a brake application caused by said inert gas supply moving said pressure responsive means thereby communicating said inert gas supply to said cylinder within said brake carrier housing to purge said brake carrier housing, said pressure responsive means being operatively connected to said pressure plate; and
   a means to vent the interior of said brake carrier housing to the surrounding atmosphere.

References Cited by the Examiner

UNITED STATES PATENTS

| | | | |
|---|---|---|---|
| 2,173,999 | 9/39 | Grundstrom | 220—89 |
| 2,372,984 | 4/45 | Pierce | 188—264.2 |
| 2,407,197 | 9/46 | Watts | 188—264.2 |
| 2,512,360 | 6/50 | McLean | 188—264.2 |
| 2,966,241 | 12/60 | Martin | 188—264.2 |

ARTHUR L. LA POINT, *Primary Examiner.*

EUGENE G. BOTZ, *Examiner.*